US009642081B2

(12) United States Patent
Maruhashi et al.

(10) Patent No.: US 9,642,081 B2
(45) Date of Patent: *May 2, 2017

(54) WIRELESS SYSTEM AND CONTROL METHOD OF WIRELESS SYSTEM

(71) Applicant: NEC CORPORATION, Tokyo (JP)

(72) Inventors: Kenichi Maruhashi, Tokyo (JP); Daisuke Inoue, Tokyo (JP); Kouji Kobukata, Tokyo (JP); Tadashi Takahama, Tokyo (JP); Ken Tanaka, Tokyo (JP); Shuuya Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 14/438,921

(22) PCT Filed: Dec. 11, 2013

(86) PCT No.: PCT/JP2013/007287
§ 371 (c)(1),
(2) Date: Apr. 28, 2015

(87) PCT Pub. No.: WO2014/097581
PCT Pub. Date: Jun. 26, 2014

(65) Prior Publication Data
US 2015/0304947 A1    Oct. 22, 2015

(30) Foreign Application Priority Data

Dec. 19, 2012  (JP) ................................ 2012-276370

(51) Int. Cl.
*H04W 52/02*     (2009.01)
*H04W 48/08*     (2009.01)
(Continued)

(52) U.S. Cl.
CPC ....... *H04W 52/0206* (2013.01); *H04W 48/08* (2013.01); *H04W 4/008* (2013.01); *H04W 84/12* (2013.01); *Y02B 60/50* (2013.01)

(58) Field of Classification Search
None
See application file for complete search history.

(56) References Cited

U.S. PATENT DOCUMENTS

2010/0046468 A1\* 2/2010 Oi .......................... H04W 84/20
370/331
2011/0158212 A1\* 6/2011 Sakai .................... H04W 8/005
370/338

FOREIGN PATENT DOCUMENTS

JP    2010-056955 A    3/2010
JP    2011-193162 A    9/2011
(Continued)

OTHER PUBLICATIONS

International Search Report for PCT/JP2013/007287 dated Mar. 4, 2014.

*Primary Examiner* — Joseph Bednash
(74) *Attorney, Agent, or Firm* — Sughrue Mion, PLLC

(57) ABSTRACT

[Problems to be Solved]
It is an object to provide a wireless system and a control method of the wireless system capable of determining whether a beacon transmission function is accepted.
[Solution]
A wireless system of the present invention includes a first wireless terminal including wide area wireless communication means connecting to an external network, and first narrow area wireless communication means having a beacon transmission function for transmitting a beacon for communication control, and a second wireless terminal including second narrow area wireless communication means capable of communicating with the first narrow area wireless com- (Continued)

munication means, wherein the second wireless terminal connects to the external network via the second narrow area wireless communication means, the first narrow area wireless communication means, and the wide area wireless communication means, and when the first narrow area wireless communication means receives, from the second narrow area wireless communication means, a request signal for requesting the beacon transmission function to be transited to the second narrow area wireless communication means, the first narrow area wireless communication means transits the beacon transmission function to the second narrow area wireless communication means.

6 Claims, 10 Drawing Sheets

(51) Int. Cl.
*H04W 4/00* (2009.01)
*H04W 84/12* (2009.01)

(56) References Cited

FOREIGN PATENT DOCUMENTS

| | | |
|---|---|---|
| JP | 2012-090205 A | 5/2012 |
| JP | 2012-175534 A | 9/2012 |
| JP | 2013/007287 A1 | 3/2014 |
| WO | 2010/090306 A1 | 8/2010 |

* cited by examiner

WIRELESS SYSTEM AND CONTROL METHOD OF WIRELESS SYSTEM

CROSS REFERENCE TO RELATED APPLICATIONS

This application is a National Stage of International Application No. PCT/JP2013/007287 filed Dec. 11, 2013, claiming priority based on Japanese Patent Application No. 2012-276370 filed Dec. 19, 2012, the contents of all of which are incorporated herein by reference in their entirety.

TECHNICAL FIELD

This invention relates to a wireless system and a control method of the wireless system.

BACKGROUND ART

In recent years, various kinds of portable terminals such as a cellular phone and a PC (Personal Computer) have been used. In order for these portable terminals to connect to an external network, various kinds of methods may be considered, but there is a method using a relay device called a mobile router. At one end, the mobile router connects to a base station of a cellular phone and the like connecting the external network using wide area radio, and on the other side, the mobile router connects to a wireless terminal using narrow area radio such as wireless LAN (Local Area Network). The mobile router has a relay communication function for relaying communication of a wireless terminal and a base station of a cellular phone and the like, and therefore, the portable terminal connect to an external network.

Since a mobile router is carried by a user, the mobile router is driven by the electric power provided by electric accumulation means, and the mobile router executes a relay communication. Therefore, in order to increase the operation time, it is required to suppress the electric power consumption as much as possible. However, narrow area radio such as a wireless LAN has a problem in that the electric power consumption increases. More specifically, the mobile router has a function of serving as an AP (Access Point) and transmitting beacons with a regular interval, but there is no choice but to keep on transmitting beacons as long as the mobile router functions as the AP. For this reason, this results in the increase of the electric power consumption of the mobile router (i.e., AP).

PTL 1 describes a wireless LAN device that can be used not only as a wireless base station but also as a wireless client by switching the setting of the operation mode. FIG. 10 is a schematic diagram illustrating a network system 1000 to which the wireless LAN device according to PTL 1 is applied. In the network system 1000, the Internet 1100 and a wireless LAN 1200 are connected via a router 1210. The wireless LAN 1200 includes an AP 1220 connected to the router 1210 via a LAN cable 1240, and also includes Ethernet (registered trademark) converters 1221, 1222, and 1223. The Ethernet converters 1221, 1222, and 1223 are connected to a TV (Television) receiver 1211, a PC 1212, and a printer 1213, respectively, via LAN cables 1240. The AP 1220 and the Ethernet converters 1221, 1222, and 1223 are wirelessly connected.

The AP 1220 and the Ethernet converters 1221, 1222, and 1223 have the same configuration. These can be used not only as a wireless base station (AP) but also as a wireless client (client) by switching the setting of the operation mode. These are collectively referred to as wireless LAN devices.

When one of the wireless LAN devices is turned on, a probe request packet is transmitted to another wireless LAN device. The another wireless LAN device which is the destination of transmission of the probe request packet transmits a probe response as a response to the probe request packet to the one wireless LAN device. When the one wireless LAN device receives the probe response, the one wireless LAN device (i.e., a device in question) is activated as a wireless client (client). The wireless client does not transmit any beacon, and therefore, the electric power consumption can be reduced when it is activated as a wireless client (client).

CITATION LIST

Patent Literature

[PTL 1] Japanese Patent Laid-Open No. 2012-90205

SUMMARY OF THE INVENTION

Problems to be Solved by the Invention

The wireless LAN device described in PTL 1 has the following problem

As described above, in the wireless LAN device described in PTL 1, one wireless LAN device transmits a probe request packet to another wireless LAN device, so that the one wireless LAN device is activated as a wireless client (client).

However, PTL 1 only indicates that the wireless LAN device transmits a probe request packet to another wireless LAN device, and even if the device in question is more appropriate as an AP than another device, the device in question cannot be activated as the AP instead of the another device.

It is an object of the present invention to provide a wireless system and a control method of the wireless system solving the above problem.

Means for Solving the Problems

A wireless system according to the present invention includes a first wireless terminal including wide area wireless communication means connecting to an external network and first narrow area wireless communication means having a beacon transmission function for transmitting a beacon for communication control, and a second wireless terminal including second narrow area wireless communication means capable of communicating with the first narrow area wireless communication means, wherein the second wireless terminal connects to the external network via the second narrow area wireless communication means, the first narrow area wireless communication means, and the wide area wireless communication means, and when the first narrow area wireless communication means receives, from the second narrow area wireless communication means, a request signal for requesting the beacon transmission function to be transited to the second narrow area wireless communication means, the first narrow area wireless communication means transits the beacon transmission function to the second narrow area wireless communication means.

A control method of a wireless system according to the present invention includes, in a first wireless terminal, causing wide area wireless communication means to communicate with an external network, causing first narrow area wireless communication means to transmit a beacon signal for communication control, and transiting a transmission function of a beacon signal to the second narrow area wireless communication means when a request signal for requesting the transmission function of the beacon signal to be transited to the second narrow area wireless communication means is received from a second wireless terminal having second narrow area wireless communication means communicating with the first narrow area wireless communication means, and the control method includes, in the second wireless terminal, connecting to the external network via the second narrow area wireless communication means, the first narrow area wireless communication means, and the wide area wireless communication means.

Advantage of the Invention

According to the present invention, a wireless system and a control method of the wireless system solving the above problem is provided.

MODES FOR CARRYING OUT THE INVENTION

First Exemplary Embodiment

A wireless system according to the first exemplary embodiment of the present invention will be hereinafter explained with reference to FIGS. 1 to 3.

Figure 1:
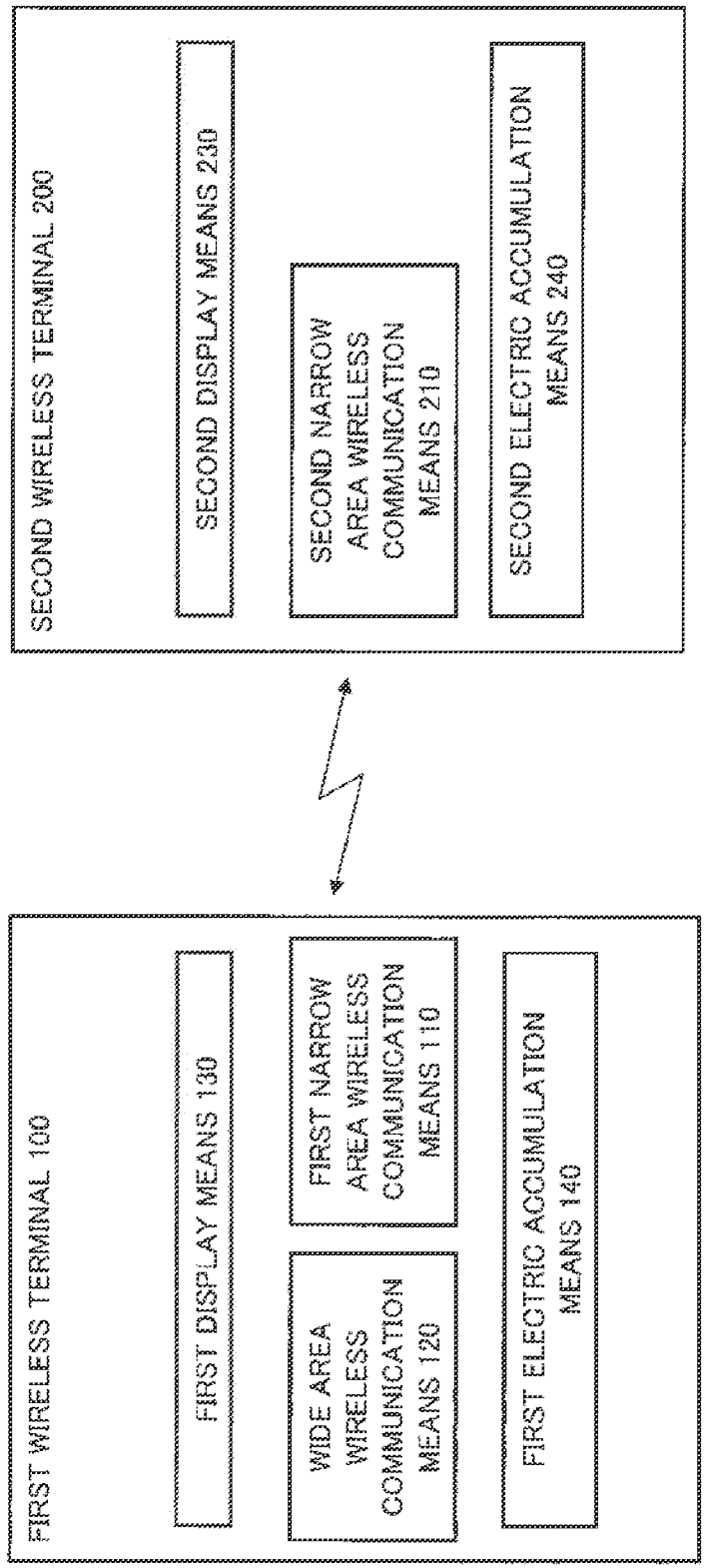
FIG. 1 is a schematic diagram illustrating a wireless system according to a first exemplary embodiment.

FIG. 1 is a schematic diagram illustrating the wireless system according to the first exemplary embodiment of the present invention. The first wireless terminal 100 includes first narrow area wireless communication means 110, wide area wireless communication means 120 connecting to an external network, not shown, first display means 130, and first electric accumulation means 140. The second wireless terminal 200 includes second narrow area wireless communication means 210 capable of communicating with the first narrow area wireless communication means 110, and second display means 230, and second electric accumulation means 240.

The first narrow area wireless communication means 110 and the second narrow area wireless communication means 210 can use, for example, wireless communication means capable of performing communicating based on wireless LAN of which communication range is about 100 m. The first narrow area wireless communication means 110 and the second narrow area wireless communication means 210 can communicate with each other.

The wide area wireless communication means 120 can use wireless communication means capable of connecting to an external network via a base station, not shown, with wireless communication using a mobile communication network.

A wide area wireless communication performed by the wide area wireless communication means 120 may normally incur a communication charge. On the other hand, a narrow area wireless communication performed by the first narrow area wireless terminal 110 and the second narrow area wireless terminal 210 basically does not incur any communication charge. The first wireless terminal 100 connects to an external system via the wide area wireless communication means 120. The second wireless terminal 200 can connect to an external system via the second narrow area wireless communication means 210, the first narrow area wireless communication means 110, and the wide area wireless communication means 120. Therefore, two wireless terminals can use a single wide area wireless communication, which suppresses the increase in the communication charge required for the wide area wireless communication.

The first display means 130 and the second display means 230 may use any display means as long as it can display information, and can use a liquid crystal display, an organic EL (Electro-Luminescence) display, and the like.

The first electric accumulation means 140 and the second electric accumulation means 240 can use any means as long as it uses an electric accumulation function, and can use, for example, a lithium ion secondary battery and the like. The first electric accumulation means 140 and the second electric accumulation means 240 provide electric power used to drive the first wireless terminal 100 and the second wireless terminal 200, respectively.

In the operation of the wireless system having the above configuration, the first wireless terminal 100 includes the wide area wireless communication means 120. For this reason, as compared with the second wireless terminal 200, the electric power consumed by the first wireless terminal 100 is higher by an amount required to drive the wide area wireless communication means 120. Since the first wireless terminal 100 has the wide area wireless communication means 120, the first wireless terminal 100 serves as the AP in terms of relationship with the second narrow area wireless communication means 210. The AP has a beacon transmission function for transmitting a beacon signal for controlling another wireless terminal connecting to the AP, and therefore, the electric power consumed by the first wireless terminal 100 is higher than the second wireless terminal 200.

Therefore, in the wireless system according to the first exemplary embodiment of the present invention, the electric power consumed by the first wireless terminal 100 may be higher than the electric power consumed by the second wireless terminal 200. In the wireless system according to the first exemplary embodiment of the present invention, the first narrow area wireless communication means 110 receives, from the second narrow area wireless communication means 120, a request signal requesting transition of a beacon transmission function to the second narrow area wireless communication means 120. When the first narrow area wireless communication means 110 receives the request signal, the first narrow area wireless communication means 110 performs a beacon transmission function transition to transit the beacon transmission function from the first narrow area wireless communication means 100 to the second narrow area wireless communication means 200.

Figure 2:
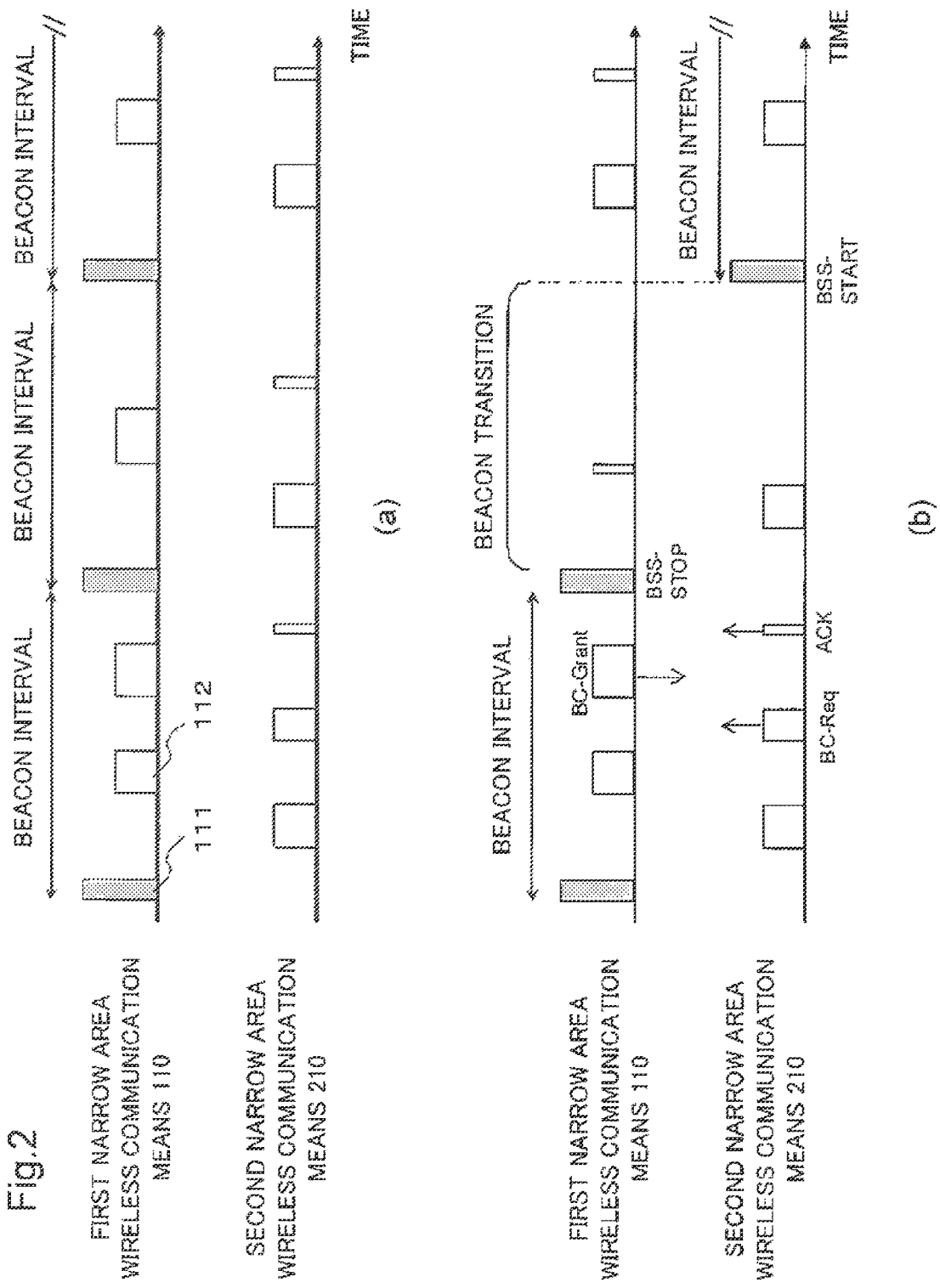
FIG. 2 is a diagram illustrating beacon transmission function transition of the wireless system according to the first exemplary embodiment.

FIG. 2 is a diagram illustrating a beacon transmission function transition in the wireless system according to the first exemplary embodiment of the present invention. FIG. 2 (a) is a diagram for explaining communication between the first narrow area wireless communication means 110 and the second narrow area wireless communication means 210. First, the first narrow area wireless communication means 110 serves as the AP to transmit a beacon signal 111. The beacon signal 111 is transmitted with a regular interval (beacon interval). Since the beacon signal 111 is a signal for controlling another terminal connecting to the AP, the second narrow area wireless communication means 210 receives this beacon signal 111, and interprets the control indicated by the beacon signal 111. The second narrow area wireless communication means 210 and the first narrow area wireless communication means 110 are alternately transit data 112 in a time divisional manner. The data 112 include both of a parameter for controlling the narrow area wireless communication and information exchanged in communication.

FIG. 2 (b) is a diagram for explaining operation of beacon transmission function transition between the first narrow area wireless communication means 110 and the second narrow area wireless communication means 210. The second narrow area wireless communication means 210 transmits, to the first narrow area wireless communication means 110, a request signal (BC-Req) requesting the beacon transmission function to be transited to the second narrow area wireless communication means 210. When the first narrow area wireless communication means 110 grants the beacon transmission function transition, the first narrow area wireless communication means 110 transmits a grant signal (BC-Grant) to that effect. When the second narrow area wireless communication means 210 receives the grant signal (BC-Grant), the second narrow area wireless communication means 210 transmits an acknowledgement (Ack), so that an agreement of transition is established. When the agreement is obtained, the first narrow area wireless communication means 110 declares to stop operation as the AP, and terminates BSS (BSS: Basic Service Set) (BSS-STOP). The declaration and the termination of the BSS is to notify a message indicating the stop of the operation as the AP to each narrow area wireless communication means when there is any other narrow area wireless communication means connected to the network (BSS) other than the second narrow area wireless communication means 210.

Subsequently, the second narrow area wireless communication means 210 declares to start operation as the AP (BSS-START), and starts beacon transmission, so that the second narrow area wireless communication means 210 can communicate with the first narrow area wireless communication means 110.

Figure 3:
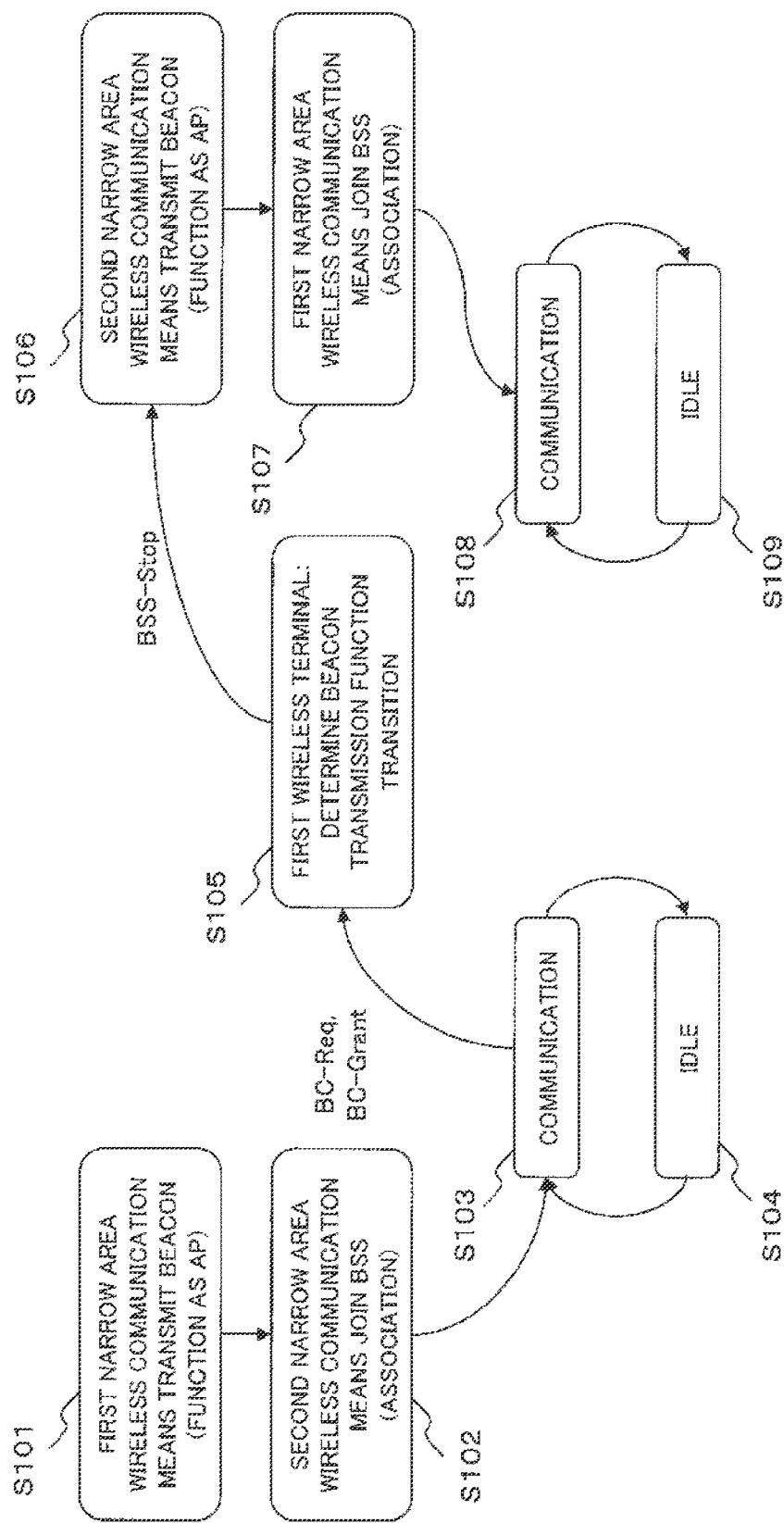
FIG. 3 illustrates, in a state transition diagram, operation of the wireless system according to the first exemplary embodiment

FIG. 3 illustrates, in a state transition diagram, operation of a wireless system according to the first exemplary embodiment of the present invention. The first narrow area wireless communication means 110 provided in the first wireless terminal 100 functions as the AP, and transmits a beacon (functioning as the AP: S101). The second narrow area wireless communication means 210 provided in the second wireless terminal 200 joins the BSS controlled by the first wireless terminal 100 (association: S102). Thereafter, the second narrow area wireless communication means 210 communicates various kinds of data and control data as necessary (S103), or transits to an idle state (S104). The second narrow area wireless communication means 210 transmits, to the first narrow area wireless communication means 110, a request signal (BC-Req) of requesting beacon transmission function transition. The first wireless terminal 100 determines whether the beacon transmission function transition is performed or not (S105). When the first wireless terminal 100 determines that the beacon transmission function transition is to be performed, the first wireless terminal 100 transmits a grant signal (BC-Grant).

When the second narrow area wireless communication means 210 receives the grant signal (BC-Grant), the second narrow area wireless communication means 210 transmits an acknowledgement (Ack), so that an agreement of transition is established. When the agreement is obtained, the first narrow area wireless communication means 110 declares to stop operation as the AP, and terminates the BSS (BSS-STOP). The second narrow area wireless communication means 210 provided in the second wireless terminal 200 functions as the AP, and transmits the beacon (S106). The first narrow area wireless communication means 110 provided on the first wireless terminal 100 joins the BBS controlled by the second wireless terminal (S107). Therefore, the first narrow area wireless communication means 110 communicates various kinds of data and control data as necessary (S108), or transits to the idle state (S109).

According to the wireless system according to the first exemplary embodiment, the second wireless terminal 200 can accept the beacon transmission function based on the determination made by the second wireless terminal 200 (i.e., the device in question). Therefore, a request indicating that the second wireless terminal 200 actively accepts the function as the AP, i.e., the beacon transmission function can be transmitted to the first wireless terminal 100 serving as the AP. The first wireless terminal 100 can reduce the electric power consumption of the first wireless terminal 100.

It is noted that the second display means 230 may be configured to be larger than the first display means 130. In recent years, a service is provided to obtain health information and life information about a user, and providing advice to the user on the basis of the information. A service is provided to allow a corporation to use the information for marketing and transmitting an advertisement suitable for the preference of the user on the basis of the information.

When these services are realized with the wireless system according to the first exemplary embodiment of the present invention, a device collecting health information and life information about a user is considered to be the first wireless terminal 100 that is considered to be a cellular phone carried by the user in everyday life. For example, the first wireless terminal 100 includes an acceleration sensor, and can record the number of steps taken by the user, a microphone capable of recording the activity amount of the user. When the first wireless terminal 100 includes a microphone, the first wireless terminal 100 collects voice and environment sound, so that the first wireless terminal 100 can estimate the activity amount of the user. When the first wireless terminal 100 includes a camera, and the camera captures an image of meal, the first wireless terminal 100 can estimate the calorie taken.

Therefore, when the first wireless terminal 100 is a cellular phone carried with the user in everyday life, the first wireless terminal 100 cannot have large display means implemented thereon from the perspective of ensuring portability, and this reduces the viewability. Therefore, it is possible to employ such a configuration that the second wireless terminal 200 includes the second display means 230 larger than the first display means 130. The first narrow area wireless means 110 and the second narrow area wireless means 210 can share information displayed on the first display means 130 within a range in which the first narrow area wireless means 110 and the second narrow area wireless means 210 can communicate with each other. More specifically, information displayed on the first display means 130 is displayed on the second display means 230. The second display means 230 is substituted for the first display means 130, so that the viewability can be improved.

Each of the first wireless terminal 100 and the second wireless terminal 200 may have input means. The input means may be buttons such as a keyboard and numeric keys, or may be the first display means 130 and the second display means 230 having touch screens. With the input means, the first wireless terminal 100 and the second wireless terminal 200 can be operated.

The user uses the input means of the first wireless terminal 100 and may perform operation while seeing the second display means 230 larger than the first display means 130. For example, the user can perform key input operation by using the input means of the first wireless terminal 100, and while seeing the second display means 230 provided with the second wireless terminal 200, the user can write a communication message of an e-mail. When the user is skilled in the operation of the input means of the first wireless terminal 100, the user can easily perform operation. When a touch screen is used as the input means, the user can perform input operation by using the second display means 230 larger than the first first display means 130, which improves the operability.

Second Exemplary Embodiment

A wireless system according to the second exemplary embodiment will be explained with reference to FIG. 4.

The configuration of the wireless system according to the second exemplary embodiment is the same as that of the first exemplary embodiment. In the wireless system according to the second exemplary embodiment, the first wireless terminal 100 receives a request signal, and when an electric power used to drive the first wireless terminal 100 is provided from the outside, the beacon transmission function transition is not performed. The wireless system according to the second exemplary embodiment is different from the wireless system according to the first exemplary embodiment in this feature.

Figure 4:
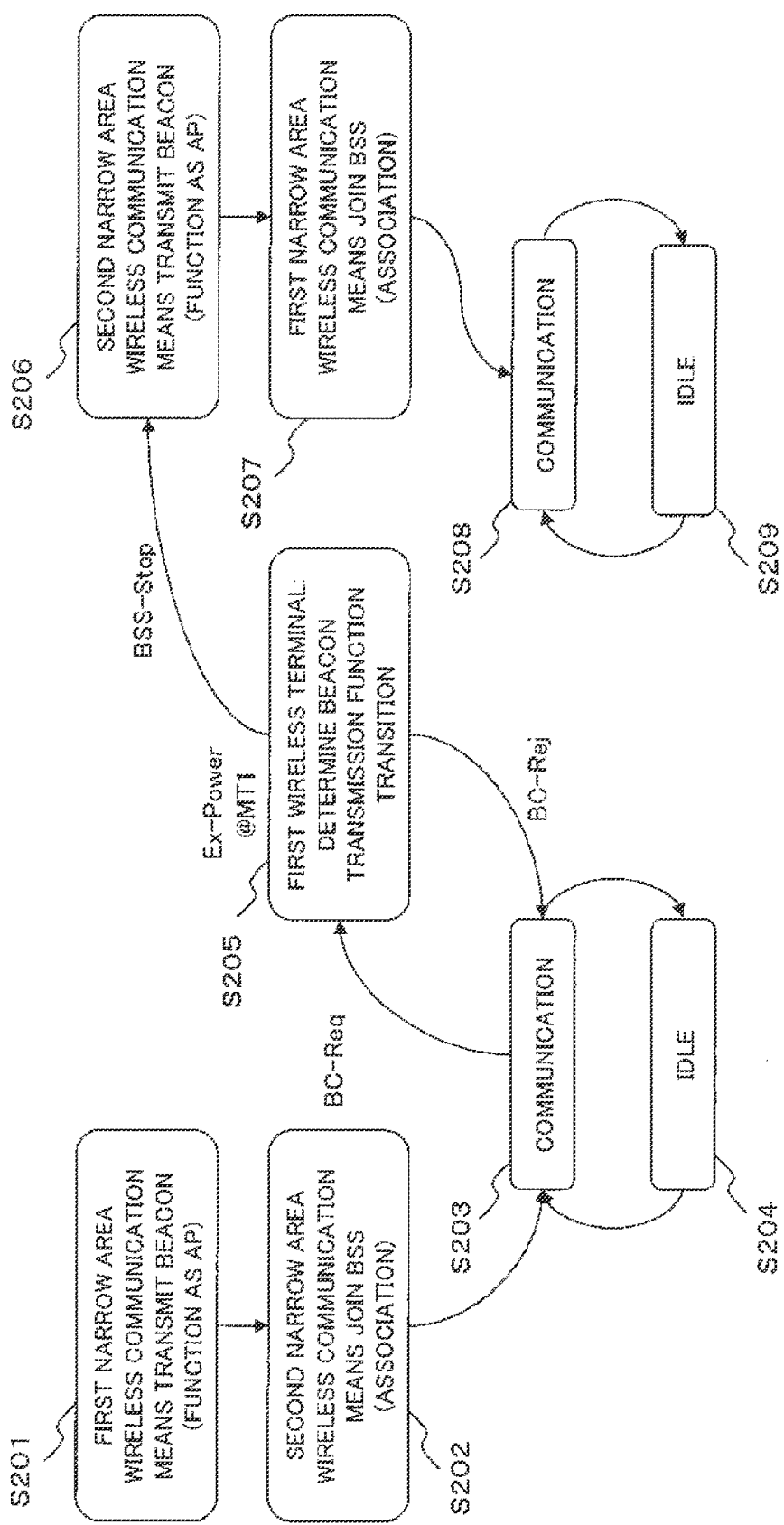
FIG. 4 illustrates, in a state transition diagram, operation of a wireless system according to a second exemplary embodiment.

FIG. 4 illustrates, in a state transition diagram, operation of the wireless system according to the second exemplary embodiment.

First, the first narrow area wireless communication means 110 provided on the first wireless terminal 100 functions as the AP, and transmits a beacon (functioning as the AP: S201). The second narrow area wireless communication means 210 provided in the second wireless terminal 200 joins the BSS controlled by the first wireless terminal 100 (association: S202). Thereafter, the second wireless terminal 200 communicates various kinds of data and control data as necessary (S203), or transits to an idle state (S204).

The second narrow area wireless communication means 210 transmits, to the first narrow area wireless communication means 110, a request signal (BC-Req) of requesting beacon transmission function transition. The first wireless terminal 100 determines whether the beacon transmission function transition is performed or not (S205). In this case, the first wireless terminal 100 determines whether the electric power used to drive the first wireless terminal 100 is provided from the outside or not (Ex-Power@MT1). When the electric power used to drive the first wireless terminal 100 is determined to be provided from the outside, the first wireless terminal 100 rejects the request (BC-Rej), and the operation of the wireless system returns back to S203 or S204. When the electric power used to drive the first wireless terminal 100 is determined not to be provided from the outside, the operation of the wireless system transits in the same manner as S105 to S109 of FIG. 3 in the first exemplary embodiment (S206 to S209).

According to the wireless system according to the second exemplary embodiment, when the electric power used to drive the first wireless terminal 100 is determined not to be provided from the outside, the second wireless terminal 200 accepts the beacon transmission function. With the above configuration, the first wireless terminal 100 is prevented from transiting the beacon transmission function to the second narrow area wireless communication means 210 even in a case where the electric power used to drive the first wireless terminal 100 is provided from the outside. Therefore, the second wireless terminal 200 can prevent unnecessary electric power consumption.

Third Exemplary Embodiment

A wireless system according to the third exemplary embodiment will be explained with reference to FIG. 5.

The configuration of the wireless system according to the third exemplary embodiment is the same as that of the first exemplary embodiment. In the wireless system according to the third exemplary embodiment, the second wireless terminal 200 obtains information about whether the electric power used to drive the first wireless terminal 100 is provided from the outside or not. When the electric power for driving the first wireless terminal 100 is provided from the outside, the second wireless terminal 200 does not transmit a request signal. The wireless system according to the third exemplary embodiment is different from the wireless system according to the first exemplary embodiment in this feature.

Figure 5:
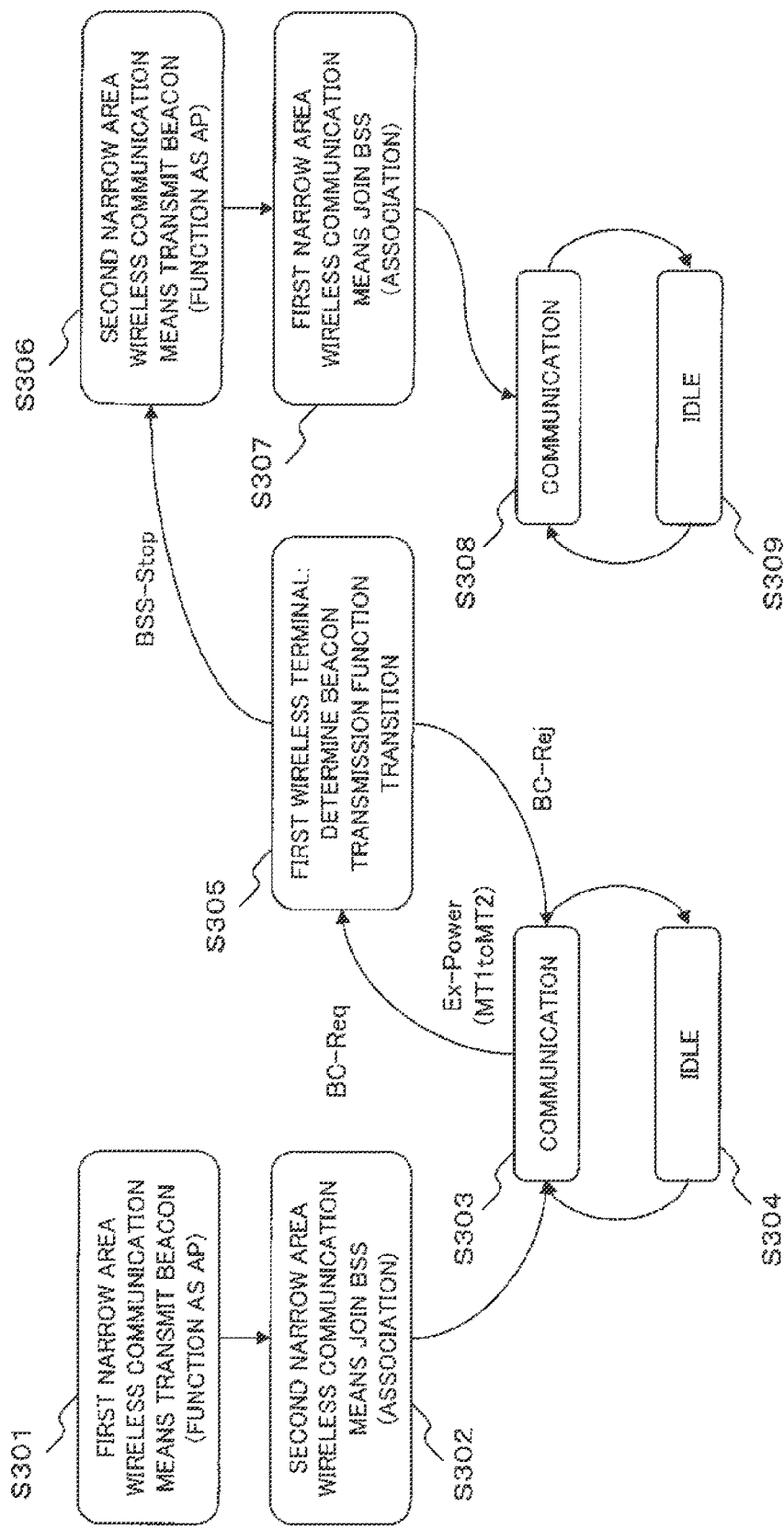
FIG. 5 illustrates, in a state transition diagram, operation of a wireless system according to a third exemplary embodiment.

FIG. 5 illustrates, in a state transition diagram, operation of the wireless system according to the third exemplary embodiment. First, the first narrow area wireless communication means 110 provided on the first wireless terminal 100 functions as the AP, and transmits a beacon (functioning as the AP: 3201). The second narrow area wireless communication means 210 provided in the second wireless terminal 200 joins the BSS controlled by the first wireless terminal 100 (association: S302). Thereafter, the second wireless terminal 200 communicates various kinds of data and control data as necessary (S303), or transits to an idle state (S304).

In this case, during communication (S303), the second narrow area wireless communication means 210 obtains information about whether the electric power used to drive the first wireless terminal 100 is provided from the outside or not (Ex-Power (MT1toMT2)).

The second wireless terminal 200 determines whether to transmit a request signal (BC-Req) on the basis of the information about whether the electric power used to drive the first wireless terminal 100 is provided from the outside or not. More specifically, when the electric power used to drive the first wireless terminal 100 is determined to be provided from the outside, the second wireless terminal 200 does not transmit the request signal (BC-Req), and when the electric power is determined to be provided from the outside, the second wireless terminal 200 transmits the request signal (BC-Req).

The first narrow area wireless communication means 110 receives the request signal (BC-Req). When the first wireless terminal 100 rejects the request, the first wireless terminal 100 rejects the request (BC-Rej), the operation of the wireless system returns back to S303 or S304. On the other hand, when the first wireless terminal 100 does not reject the request, the operation of the wireless system transits in the same manner as S105 to S109 of FIG. 3 in the first exemplary embodiment (S306 to S309).

According to the wireless system according to the third exemplary embodiment, the second wireless terminal 200 obtains the information about whether the electric power used to drive the first wireless terminal 100 is provided from the outside or not through communication before the second wireless terminal 200 transmits a request signal. When the electric power for driving the first wireless terminal is determined to be provided from the outside, the second narrow area wireless communication means 210 does not transmit the request signal. When the electric power for driving the first wireless terminal 100 is determined to be provided from the outside, the second wireless terminal 200 does not need to perform the beacon transmission function transition, and it is not necessary for the second wireless terminal 200 to transmit the request signal. When the wireless system according to the third exemplary embodiment is employed, it is possible to reduce the electric power used by the second narrow area wireless communication means 210 to transmit a request signal and the electric power used by the first wireless terminal 100 to make a determination as to whether the beacon transmission function transition is to be performed or not.

Fourth Exemplary Embodiment

A wireless system according to the fourth exemplary embodiment will be explained with reference to FIG. 6. The configuration of the wireless system according to the fourth exemplary embodiment is the same as that of the first exemplary embodiment. In the wireless system according to the fourth exemplary embodiment, the first wireless terminal 100 obtains information about whether the electric power used to drive the second wireless terminal 200 is provided from the outside or not. When the electric power used to drive the second wireless terminal 200 is determined to be provided from the outside, the first wireless terminal 100 performs the beacon transmission function transition. The wireless system according to the fourth exemplary embodiment is different from the wireless system according to the first exemplary embodiment in this feature.

Figure 6:
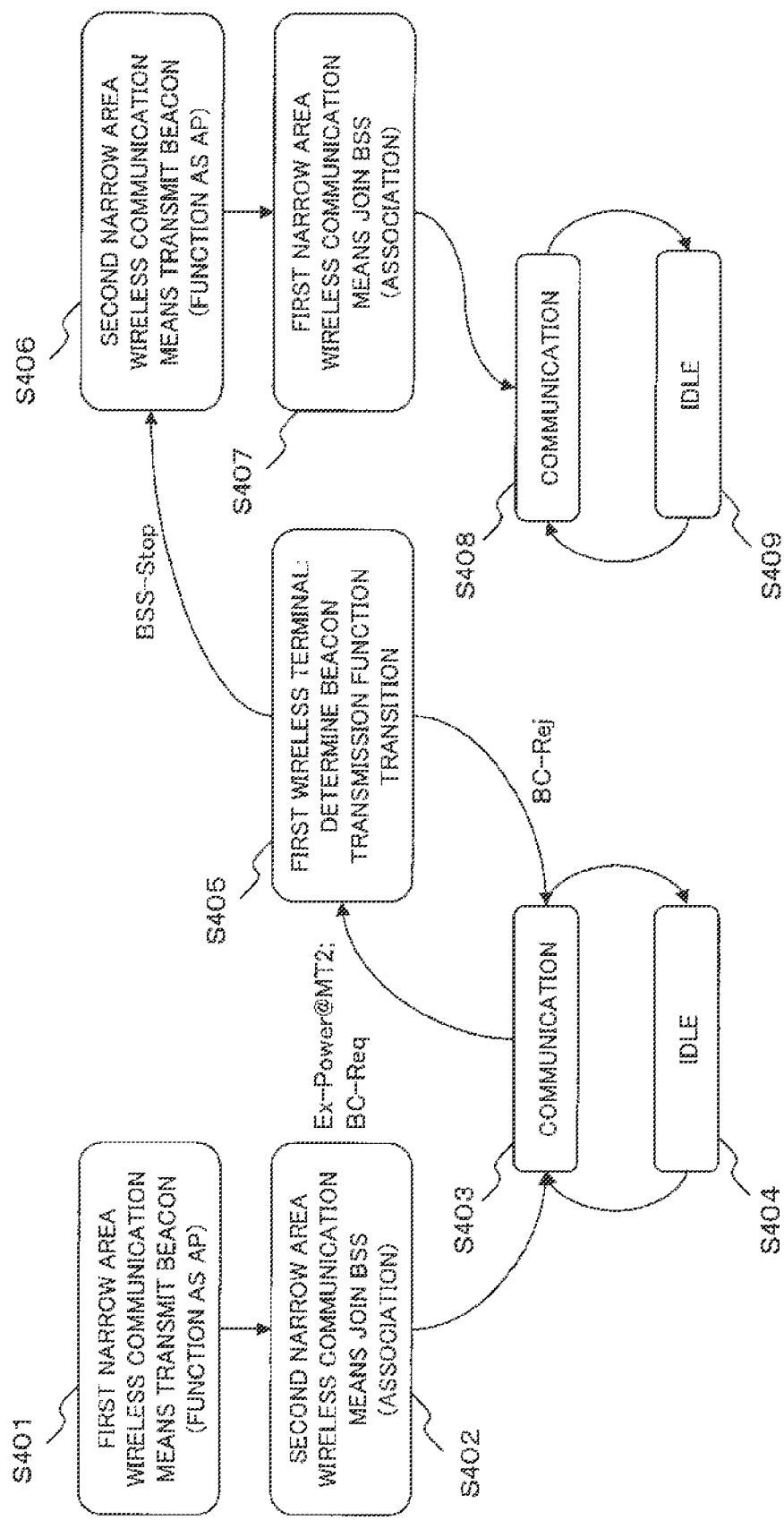
FIG. 6 illustrates, in a state transition diagram, operation of a wireless system according to a fourth exemplary embodiment.

FIG. 6 illustrates, in a state transition diagram, operation of the wireless system according to the fourth exemplary embodiment. First, the first narrow area wireless communication means 110 provided on the first wireless terminal 100 functions as the AP, and transmits a beacon (functioning as the AP: S401). The second narrow area wireless communication means 210 provided in the second wireless terminal 200 joins the BSS controlled by the first wireless terminal 100 (association: S402). Thereafter, the second wireless terminal 200 communicates various kinds of data and control data as necessary (S403), or transits to an idle state (S404).

Before the second wireless communication means 210 transmits a request signal (BC-Req) to the first wireless communication means 110, the second wireless communication means 210 transmits information about whether the electric power used to drive the second wireless terminal 200 is provided from the outside or not (Ex-Power@MT2). Alternatively, at the same time with the request signal (BC-Req), the second wireless communication means 210 transmits information about whether the electric power used to drive the second wireless terminal is provided from the outside or not (Ex-Power@MT2).

The first wireless terminal 100 determines whether the beacon transmission function transition is performed or not (S405). When the electric power used to drive the second wireless terminal 100 is not provided from the outside, the first wireless terminal 100 rejects the request (BC-Rej), and the operation of the wireless system returns back to S403 or S404. When the electric power used to drive the second wireless terminal 100 is determined to be provided from the outside, the operation of the wireless system transits in the same manner as S105 to S109 of FIG. 3 in the first exemplary embodiment (S406 to S409).

In the wireless system according to the fourth exemplary embodiment, the first wireless terminal 100 obtains information about whether the electric power used to drive the second wireless terminal 200 is provided from the outside or not. When the electric power used to drive the second wireless terminal 200 is determined to be provided from the outside, the beacon transmission function transition is performed. With this configuration, when the electric power is determined to be provided from the outside to the second wireless terminal 200, the second wireless terminal 200 can accept the beacon transmission function. The second wireless terminal 200 can be prevented from accepting the beacon transmission function even when the electric power that can be consumed is limited.

When there is another wireless terminal capable of beacon transmission function transition, the wireless system can make an appropriate determination as to whether the second wireless terminal 200 transmitting the request signal is suitable or another wireless terminal is suitable, in view of the situation of the electric power used to drive each wireless terminal.

Fifth Exemplary Embodiment

A wireless system according to the fifth exemplary embodiment will be explained with reference to FIG. 7. The configuration of the wireless system according to the fifth exemplary embodiment is the same as that of the first exemplary embodiment. The wireless system according to the fifth exemplary embodiment is different in the following feature. More specifically, when communication between the first narrow area wireless means 110 and the second narrow area wireless communication means 210 is not performed for a predetermined period of time, the first narrow area wireless means 110 is in a standby mode in which the first narrow area wireless means 110 does not transmit a beacon until a communication resume request is given.

Figure 7:
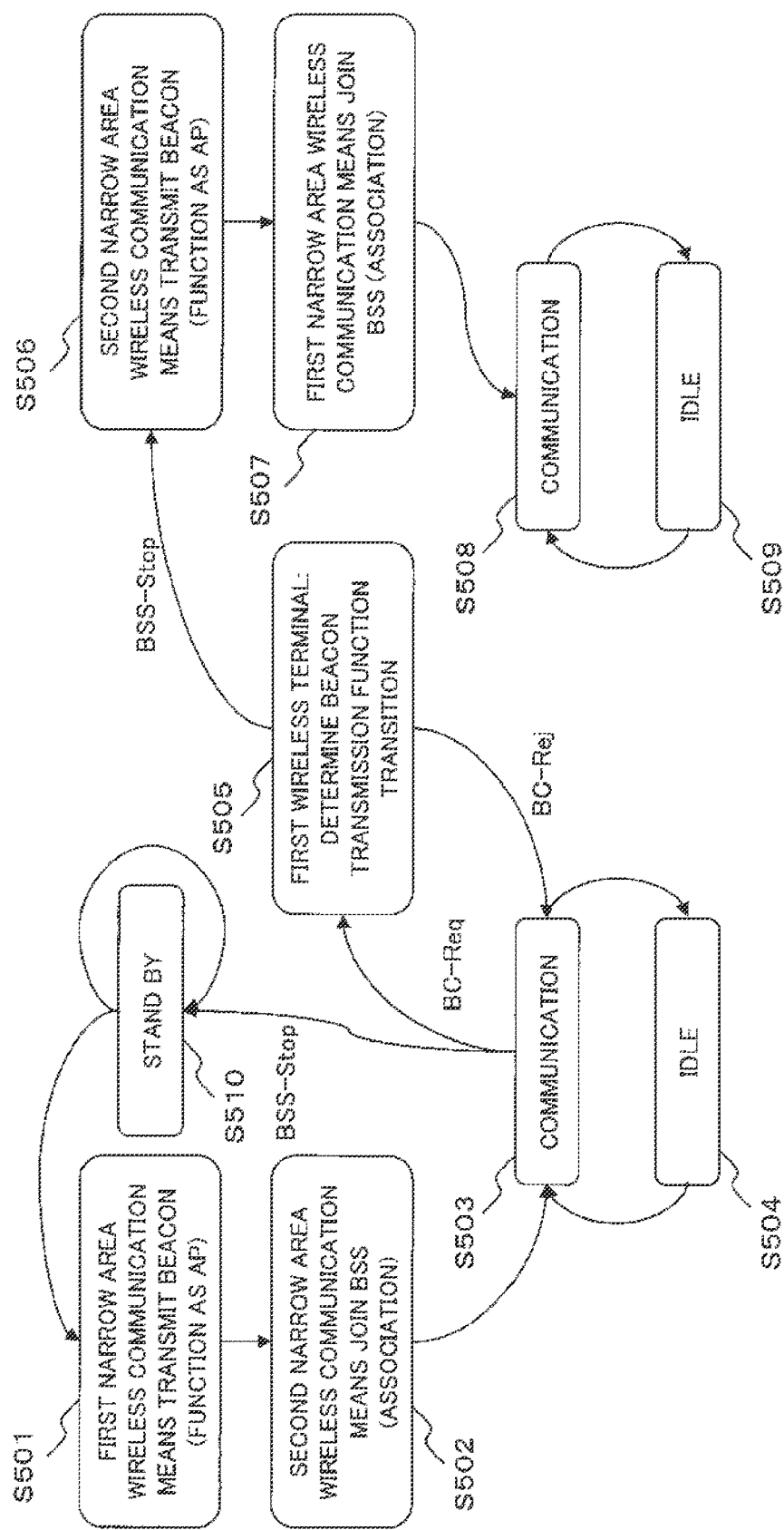
FIG. 7 illustrates, in a state transition diagram, operation of a wireless system according to a fifth exemplary embodiment.

FIG. 7 illustrates, in a state transition diagram, operation of the wireless system according to the fifth exemplary embodiment. The difference between the first to fourth exemplary embodiments and the fifth exemplary embodiment lies in that the fifth exemplary embodiment includes standby mode (S510). When communication between the first narrow area wireless means 110 and the second narrow area wireless communication means 210 is not performed for a predetermined period of time, the BSS is terminated (BSS-STOP), and the wireless system goes into the standby mode (S510). More specifically, when effective exchange of information other than control information is not performed between the first narrow area wireless communication means 110 and the second narrow area wireless communication means 210 for the predetermined period of time, the transition occurs. The predetermined period of time may be set to any time by the user, or may be set to a predetermined value in advance.

In the standby mode, the first narrow area wireless communication means 110 stops transmission of the beacon until a communication start request is received. The communication start request for resuming from the standby mode can be given when, for example, the user operates a switch and the like provided on the first wireless terminal 100.

According to the wireless system of the fifth exemplary embodiment of the present invention, the first narrow area wireless communication means 110 and the second narrow area wireless communication means 210 can be stopped until recovery from the standby mode, so that the electric power consumption during that period can be reduced.

When the first narrow area wireless communication means 110 receives a communication start request signal of a communication resume request from the second narrow area wireless communication means 210, the first narrow area wireless communication means 110 can cancel the standby mode, and can transmit beacons. When the above configuration is employed, the second narrow area wireless communication means 210 can cancel the standby mode of the first narrow area wireless communication means 110.

Figure 8:
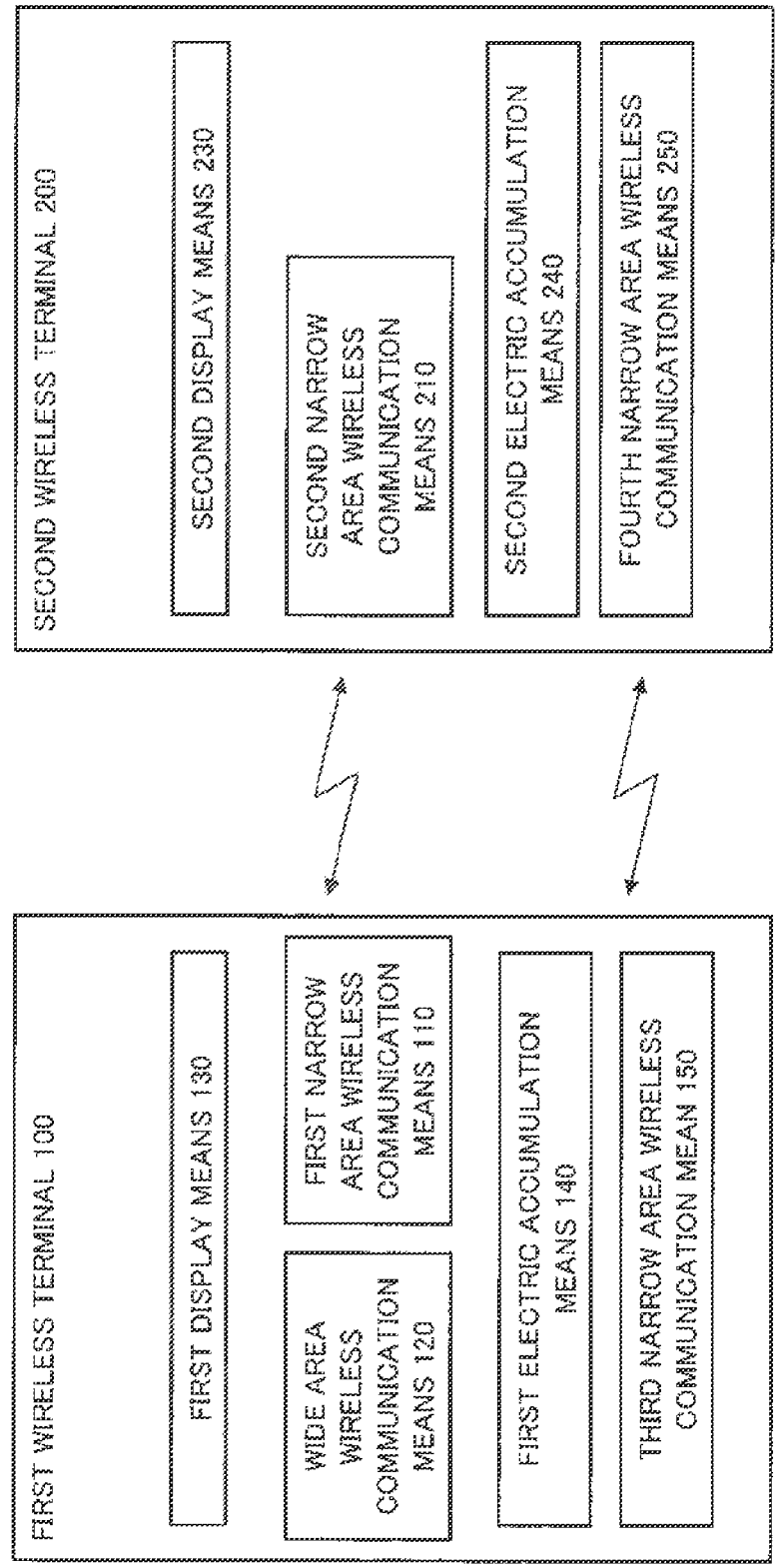
FIG. 8 is a schematic diagram illustrating a wireless system according to an example of the fifth exemplary embodiment.

Subsequently, another example of the wireless system according to the fifth exemplary embodiment will be explained with reference to FIG. 8. FIG. 8 is a schematic diagram illustrating another example of the wireless system according to the fifth exemplary embodiment. Unlike the first to fourth exemplary embodiments, the first wireless terminal 100 includes third narrow area wireless communication means 150, and the second wireless terminal 200 includes fourth narrow area wireless communication means 250 capable of communicating with the third narrow area wireless communication means 150. The third narrow area wireless communication means 150 and the fourth narrow area wireless communication means 250 consume less electric power than the first narrow area wireless communication means 110 and the second narrow area wireless communication means 120. The third narrow area wireless communication means 150 and the fourth narrow area wireless communication means 250 can use narrow area wireless communication means based on, for example, Bluetooth (registered trademark) Low Energy.

When there is a need for the second wireless terminal 200 to start the communication, the fourth narrow area wireless communication means 250 transmits a communication start request signal of communication resume request to the third narrow area wireless communication means 150. When the first wireless terminal 100 receives the communication start request signal, first wireless terminal 100 cancels the standby mode.

The third narrow area wireless communication means 150 and the fourth narrow area wireless communication means 250 can communicate with each other, and operates with less electric power, and therefore, the electric power required to command a resume from the standby mode can be suppressed.

A third wireless terminal including fifth narrow area wireless communication means capable of communicating with the third narrow area wireless communication means 150 and the fourth narrow area wireless communication means 250 may be provided. This third wireless terminal may be provided with a sensor for collecting information. A sensor can use one that can measure, for example, a body weight, a blood pressure, and the like. When the third wireless terminal is provided, various kinds of biometric information collected can be transmitted to the first wireless terminal 100 or the second wireless terminal 200 with less electric power consumption.

Sixth Exemplary Embodiment

A wireless system according to the sixth exemplary embodiment will be explained with reference to FIG. 9. The configuration of the wireless system according to the sixth exemplary embodiment is the same as that of the first exemplary embodiment. The wireless system according to the sixth exemplary embodiment is different in the following feature. More specifically, when communication between the first narrow area wireless means 110 and the second narrow area wireless communication means 210 is not performed for a predetermined period of time, the first narrow area wireless means 110 goes into an electric power saving mode in which the interval for transmitting beacons is increased until a request is given.

Figure 9:
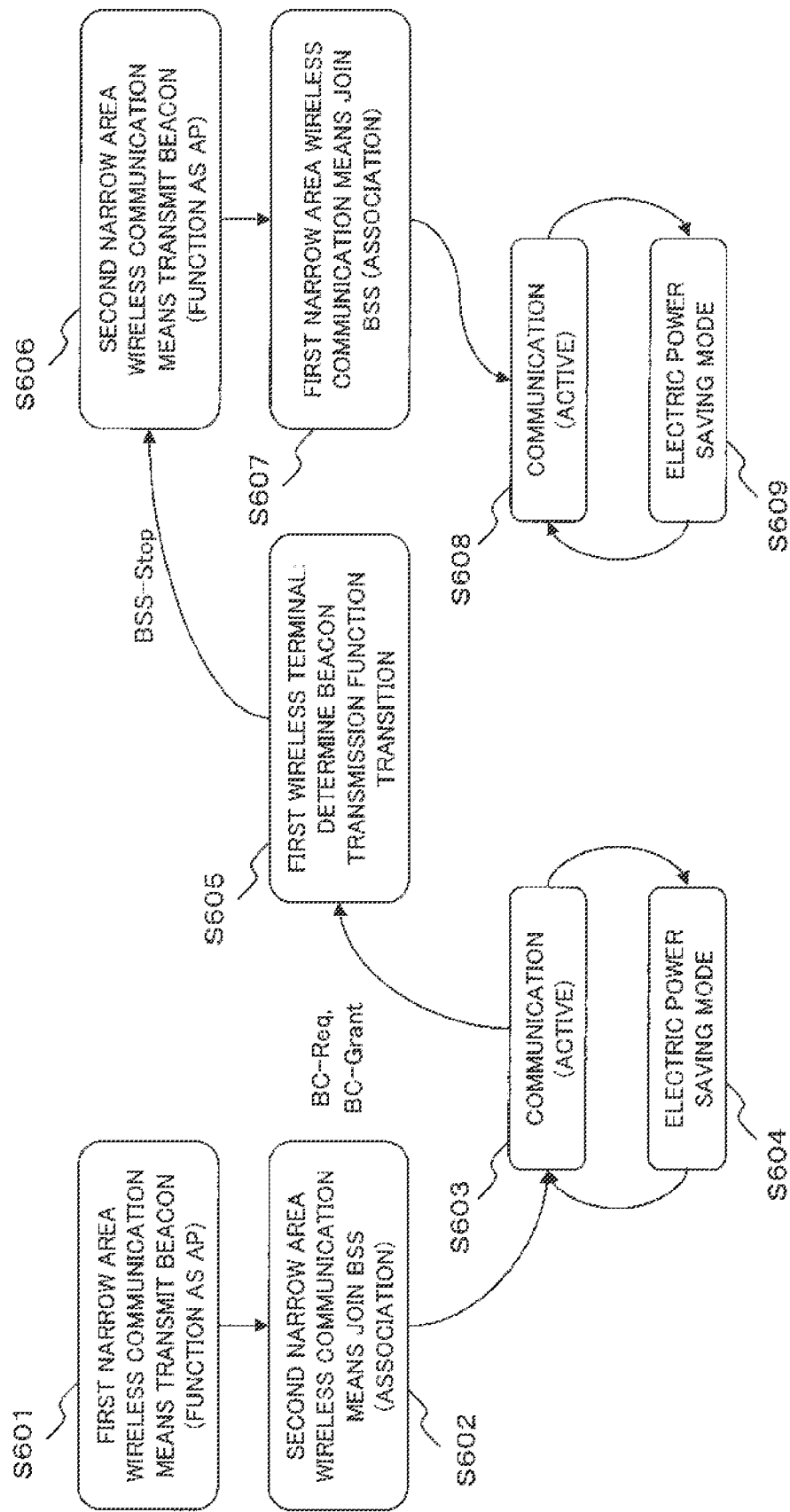
FIG. 9 illustrates, in a state transition diagram, operation of a wireless system according to a sixth exemplary embodiment.
Figure 10:
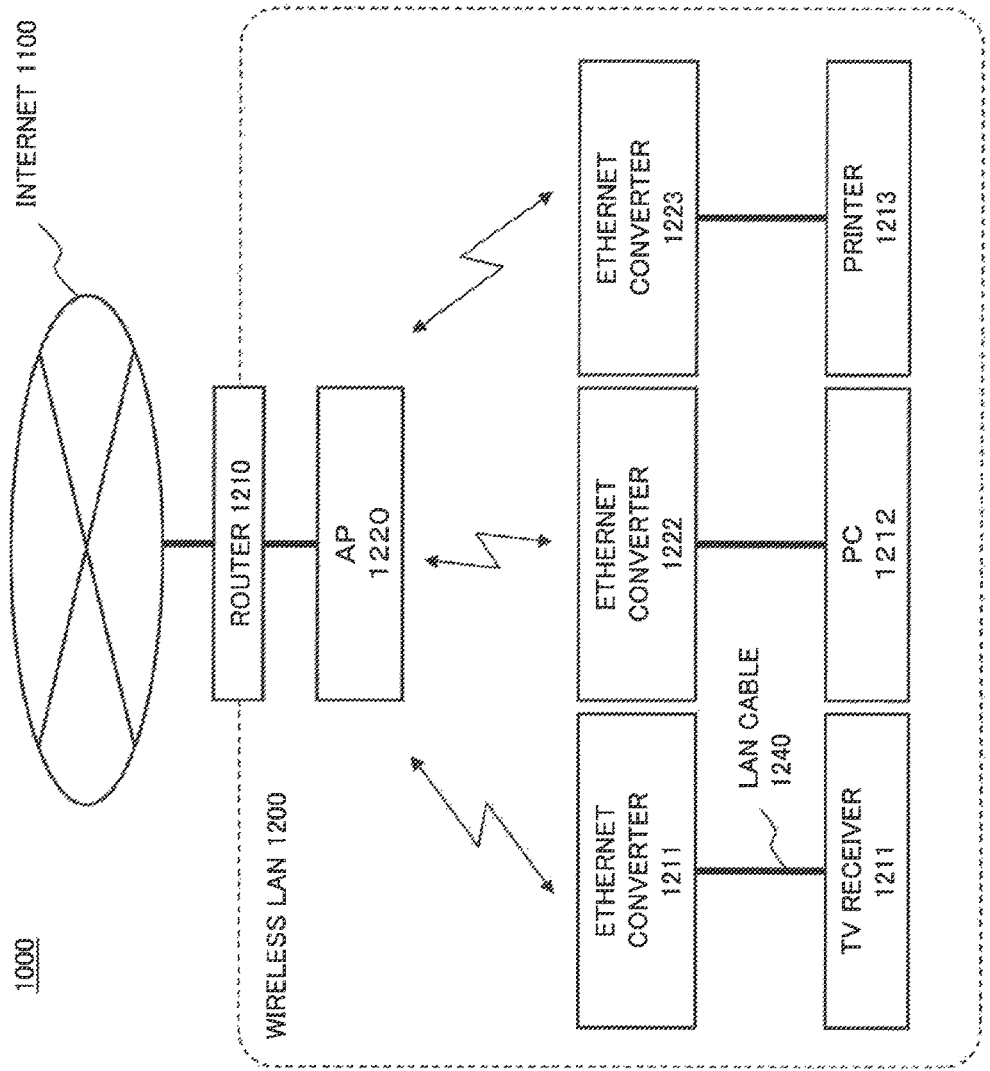
FIG. 10 is a schematic diagram illustrating a network system to which a wireless LAN device according to PTL 1 is applied.

FIG. 9 illustrates, in a state transition diagram, operation of the wireless system according to the sixth exemplary embodiment. The difference between the first to fifth exemplary embodiments and the sixth exemplary embodiment lies in that the sixth exemplary embodiment includes electric power saving mode (S604, S609).

In the electric power saving mod, the narrow area wireless communication means having an AP function can employ a configuration for increasing the beacon transmission interval. In the electric power saving mode, the narrow area wireless communication means not having any AP function goes into a doze (sleep) state, and checks whether communication is required or not with a relatively low frequency, and can determine whether to return to the active state or to continuously stay in the doze state.

According to the wireless system of the sixth exemplary embodiment of the present invention, the first narrow area wireless communication means 110 and the second narrow area wireless communication means 210 can be caused to be in the electric power saving state until recovery, and the electric power consumption during that period can be reduced.

The wireless system and the control method of the wireless system according to the present invention have been explained with reference to the exemplary embodiments, but are not limited to the exemplary embodiments. The electric accumulation state of the first or second electric accumulation means, the situation of electric power consumption, the electric power consumption prediction, the frequency of communication, and the like can be used as information for determining, for example, whether to accept beacon transmission function transition or not.

The present invention has been hereinabove explained using preferred exemplary embodiments, but the present invention is not necessarily limited to the above exemplary embodiments, and can be modified and carried out in various manners within the scope of the technical concept.

This application claims the priority based on Japanese Patent Application No. 2012-276370 filed on Dec. 19, 2012, and the entire disclosure thereof is incorporated herein by reference.

INDUSTRIAL APPLICABILITY

The present invention can be applied to a wireless system and the like in a case where a portable terminal is connected to an external network.

REFERENCE SIGNS LIST

100 First wireless terminal
110 First narrow area wireless communication means
111 Beacon signal
112 Data
120 Wide area wireless communication means
130 First display means
140 First electric accumulation means
150 Third narrow area wireless communication means
200 Second wireless terminal
210 Second narrow area wireless communication means
230 Second display means
240 Second electric accumulation means
250 Fourth narrow area wireless communication means
1000 Network system
1100 the Internet
1200 Wireless LAN
1210 Router
1211 Receiver
1212 PC
1213 Printer
1220 AP
1221 Ethernet converter
1222 Ethernet converter
1223 Ethernet converter
1240 LAN cable

The invention claimed is:

1. A control method of a wireless system comprising:
in a first wireless terminal,
causing a wide area wireless communication unit to communicate with an external network;
causing a first narrow area wireless communication unit to transmit a beacon signal for communication control; and
determining whether an electric power used to drive the first wireless terminal is provided from an outside or not when a request signal for requesting transmission function of the beacon signal to be transited to a second narrow area wireless communication unit is received from a second wireless terminal having the second narrow area wireless communication unit communicating with the first narrow area wireless communication unit,
when the electric power used to drive the first wireless terminal is determined to be provided from the outside, the transmission function of the beacon signal is not transited to the second narrow area wireless communication unit, and
when the electric power used to drive the first wireless terminal is determined to not be provided from the outside, transiting the transmission function of the beacon signal to the second narrow area wireless communication unit,
in the second wireless terminal,
connecting to the external network via the second narrow area wireless communication unit, the first narrow area wireless communication unit, and the wide area wireless communication unit.

2. The control method of the wireless system according to claim 1, wherein,
in the second wireless terminal,
information about whether an electric power used to drive the first wireless terminal is provided from an outside or not is obtained,
when the electric power used to drive the first wireless terminal is determined to be provided from the outside, the request signal is not transmitted.

3. The control method of the wireless system according to claim 1, wherein in the first wireless terminal,
information about whether an electric power used to drive the second wireless terminal is provided from an outside or not is obtained,
when the electric power used to drive the second wireless terminal is determined to be provided from the outside, the beacon transmission function is transited.

4. The control method of the wireless system according to claim 1, wherein in the first wireless terminal,
when communication between the first narrow area wireless unit and the second narrow area wireless communication unit is not performed for a predetermined period of time, the first narrow area wireless unit goes into a standby mode in which a beacon is not transmitted until a communication resume request is given.

5. The control method of the wireless system according to claim 1, wherein,
in the first wireless terminal including a third narrow area wireless communication unit consuming less electric power than the first narrow area wireless communication unit,
when a communication start request signal of communication resume request is received from a fourth narrow area wireless communication unit provided in the second wireless terminal and consuming less electric power than the second narrow area wireless communication unit, a standby mode is cancelled.

6. The control method of the wireless system according to claim 1, wherein,
in the first wireless terminal,
when communication between the first narrow area wireless unit and the second narrow area wireless communication unit is not performed for a predetermined period of time, the first wireless terminal goes into an electric power saving mode for increasing an interval of transmission of beacons until a request is given.

* * * * *